US009121608B2

(12) United States Patent
Elkady et al.

(10) Patent No.: US 9,121,608 B2
(45) Date of Patent: Sep. 1, 2015

(54) GAS TURBINE ENGINE INCLUDING SECONDARY COMBUSTION CHAMBER INTEGRATED WITH THE STATOR VANES IN THE TURBINE/EXPANSION SECTION OF THE ENGINE AND A METHOD OF OPERATING THE SAME

(75) Inventors: Ahmed Mostafa Elkady, West Chester, OH (US); Christian Lee Vandervort, Voorheesville, NY (US); Narendra Joshi, Schenectady, NY (US); Sherif Mohamed, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 842 days.

(21) Appl. No.: 13/340,229

(22) Filed: Dec. 29, 2011

(65) Prior Publication Data
US 2013/0167545 A1 Jul. 4, 2013

(51) Int. Cl.
| F02C 3/16 | (2006.01) |
| F23N 5/00 | (2006.01) |
| F02C 3/14 | (2006.01) |
| F02C 9/16 | (2006.01) |
(Continued)

(52) U.S. Cl.
CPC . *F23N 5/003* (2013.01); *F02C 3/14* (2013.01); *F02C 3/16* (2013.01); *F02C 9/16* (2013.01); *F23R 3/34* (2013.01); *F02C 3/20* (2013.01); *F23N 2041/20* (2013.01); *F23R 2900/03341* (2013.01)

(58) Field of Classification Search
CPC .... F23R 2900/03341; F23R 3/34; F02C 3/16; F02C 3/14; F02C 3/20; F02C 9/26
USPC ........... 60/39.17, 733, 776, 735, 780, 39.461, 60/39.463, 39.465
See application file for complete search history.

(56) References Cited

U.S. PATENT DOCUMENTS

| 2,780,915 A * | 2/1957 | Peter .......................... 60/39.821 |
| 2,916,876 A | 12/1959 | Colley et al. |
| 3,786,632 A | 1/1974 | Anley |
(Continued)

FOREIGN PATENT DOCUMENTS

EP 2053231 A2 4/2009

OTHER PUBLICATIONS

Sunyoup Lee, Development of Mesoscale Burner Arrays for Gas Turbine Reheat (Jun. 2006) published Ph.D. dissertation, Stanford University (on file with Stanford University).

(Continued)

*Primary Examiner* — William H Rodriguez
(74) *Attorney, Agent, or Firm* — John P. Darling

(57) ABSTRACT

A combustor system for use in a turbine engine is provided. The turbine engine includes turbine assembly that includes a fluid inlet, a fluid outlet, and a combustion gas path defined therebetween. The combustor system includes a first combustor assembly and a second combustor assembly. The first combustor assembly is coupled to the turbine assembly for channeling a first flow of combustion gases through the turbine assembly. The first combustor assembly is oriented adjacent to the turbine assembly inlet to channel the first flow of combustion gases to the turbine assembly through the turbine assembly inlet. The second combustor assembly is coupled to the turbine assembly along the combustion gas path for channeling a second flow of combustion gases through the turbine assembly.

20 Claims, 4 Drawing Sheets

(51) Int. Cl.
    *F23R 3/34*           (2006.01)
    *F02C 3/20*          (2006.01)

(56) References Cited

U.S. PATENT DOCUMENTS

| | | | |
|---|---|---|---|
| 3,866,416 A | 2/1975 | Lewis | |
| 4,197,700 A * | 4/1980 | Jahnig | 60/774 |
| 4,341,071 A * | 7/1982 | Abo et al. | 60/790 |
| 4,896,499 A | 1/1990 | Rice | |
| 5,447,023 A * | 9/1995 | Meisner et al. | 60/779 |
| 5,481,865 A * | 1/1996 | Frutschi | 60/773 |
| 5,596,871 A * | 1/1997 | Lenertz | 60/773 |
| 5,956,937 A | 9/1999 | Beichel | |
| 6,619,026 B2 * | 9/2003 | Carelli et al. | 60/39.17 |
| 6,945,030 B2 * | 9/2005 | Hirayama et al. | 60/39.27 |
| 7,603,863 B2 * | 10/2009 | Widener et al. | 60/735 |
| 7,784,261 B2 * | 8/2010 | Little | 60/39.182 |
| 2001/0047648 A1 * | 12/2001 | Griffiths | 60/39.04 |
| 2003/0221409 A1 | 12/2003 | McGowan | |
| 2006/0272331 A1 * | 12/2006 | Bucker et al. | 60/774 |
| 2007/0033945 A1 * | 2/2007 | Goldmeer et al. | 60/774 |
| 2007/0289311 A1 * | 12/2007 | Rising | 60/776 |

OTHER PUBLICATIONS

R.A. Newby et al., Gas Turbine Reheat Using In-Situ Combustion, prepared for U.S. Department of Energy, National Energy Technology Laboratory, Morgantown, WV, May 6, 2004.

A. Calvo Hernancez et al., Power and Efficiency in a Regenerative Gas-Turbine Cycle with Multiple Reheating and Intercooling Stages, 1996 J. Phys. D: Appl. Phys. 29 1462, available at http://iopscience.iop.org/0022-3727129/6/008, last visited Dec. 22, 2011.

* cited by examiner

GAS TURBINE ENGINE INCLUDING SECONDARY COMBUSTION CHAMBER INTEGRATED WITH THE STATOR VANES IN THE TURBINE/EXPANSION SECTION OF THE ENGINE AND A METHOD OF OPERATING THE SAME

BACKGROUND

The field of the disclosure relates generally to turbine engine systems, and more particularly, to a combustor system for use with turbine engines and methods of operating a turbine engine.

At least some known turbine engines include a combustor, a compressor coupled upstream from the combustor, a turbine, and a rotor assembly rotatably coupled between the compressor and the turbine. Some known rotor assemblies include a rotor shaft, and a plurality of turbine bucket assemblies coupled to the rotor shaft such that a gas flow path is defined between a turbine inlet and a turbine outlet. Each turbine bucket assembly includes a plurality of circumferentially-spaced turbine blades or buckets that extend outwardly from a rotor disk.

During operation of at least some such turbines, the compressor compresses air that is subsequently mixed with fuel prior to being channeled to the combustor. The mixture is ignited generating hot combustion gases that are channeled to the turbine inlet, through the gas flow path, and to the turbine outlet. The rotating turbine blades or buckets channel high-temperature fluids, such as combustion gases, through the turbine. The turbine extracts energy from the combustion gases for powering the compressor, as well as producing useful work to power a load, such as an electrical generator, or to propel an aircraft in flight.

At least some known turbines include a plurality of stationary stator vanes assemblies that are oriented between adjacent turbine bucket assemblies. Each stator vane assembly includes a plurality of circumferentially-spaced stator vanes that extend outwardly from a turbine casing towards a rotor assembly. Each stator vane is oriented to channel the combustion gases towards adjacent turbine buckets to rotate turbine blades. As the combustion gases impact the stator vanes, at least a portion of the combustion gas flow energy is imparted on the stator vanes. This flow energy loss reduces the combustion gas flow energy available to rotate the rotor assembly and produce useful work and reduces an operating efficiency of the turbine.

BRIEF DESCRIPTION

In one aspect, a combustor system for use in a turbine engine is provided. The turbine engine includes turbine assembly that includes a fluid inlet, a fluid outlet, and a combustion gas path defined therebetween. The combustor system includes a first combustor assembly and a second combustor assembly. The first combustor assembly is coupled to the turbine assembly for channeling a first flow of combustion gases through the turbine assembly. The first combustor assembly is oriented adjacent to the turbine assembly inlet to channel the first flow of combustion gases to the turbine assembly through the turbine assembly inlet. The second combustor assembly is coupled to the turbine assembly along the combustion gas path for channeling a second flow of combustion gases through the turbine assembly.

In another aspect, a turbine engine is provided. The turbine engine includes a compressor section, a turbine assembly coupled to the compressor section, and a combustor system that is coupled to the compressor section and the turbine assembly. The turbine assembly includes a casing defining a cavity that extends between a fluid inlet and a fluid outlet. A plurality of turbine bucket assemblies extend between the fluid inlet and the fluid outlet such that a combustion gas path is defined between the fluid inlet and the fluid outlet. A first combustor assembly is coupled to the compressor section to receive at least a portion of the air discharged by the compressor section. The first combustor assembly is oriented adjacent the turbine assembly inlet to channel a first flow of combustion gases to the turbine assembly through the turbine assembly inlet. A second combustor assembly is coupled to the turbine assembly for channeling a second flow of combustion gases through the turbine assembly. The second combustor assembly is coupled between adjacent turbine bucket assemblies.

In a further aspect, a method of operating a turbine engine is provided. The method includes channeling fuel to a first combustor assembly for generating a first flow of combustion gas. The first combustor assembly is coupled to a turbine assembly that includes an inlet, an outlet, and a plurality of turbine bucket assemblies that define a combustion gas path between the inlet and the outlet. The generated first flow of combustion gas is channeled through the turbine assembly inlet and towards each turbine bucket assembly of the plurality of turbine bucket assemblies along the combustion gas path. The method also includes channeling fuel to a second combustor assembly for generating a second flow of combustion gas within the combustion gas path, wherein the second combustor assembly is oriented between a pair of turbine bucket assemblies to at least partially define the combustion gas path. The generated second flow of combustion gas is channeled towards a downstream turbine bucket assembly of the pair of turbine bucket assemblies along the combustion gas path.

DETAILED DESCRIPTION

The exemplary methods and systems described herein overcome at least some disadvantages of known turbine engines by providing a combustor system that channels a first flow of combustion gases through a turbine inlet towards a combustion gas path, and channels a second flow of combustion gases between the inlet and a turbine outlet along the combustion gas path. More specifically, the embodiments described herein provide a combustor system that includes a first combustion assembly that is oriented with respect to the turbine inlet, and a second combustion assembly that is oriented between adjacent turbine bucket assemblies along the combustion gas path. By providing a second combustor assembly that generates a second combustion gas flow within the combustion gas path, the operating efficiency of the turbine is increased over known turbine engines.

As used herein, the term "upstream" refers to a forward or inlet end of a gas turbine engine, and the term "downstream" refers to an aft or nozzle end of the gas turbine engine.

Figure 1:
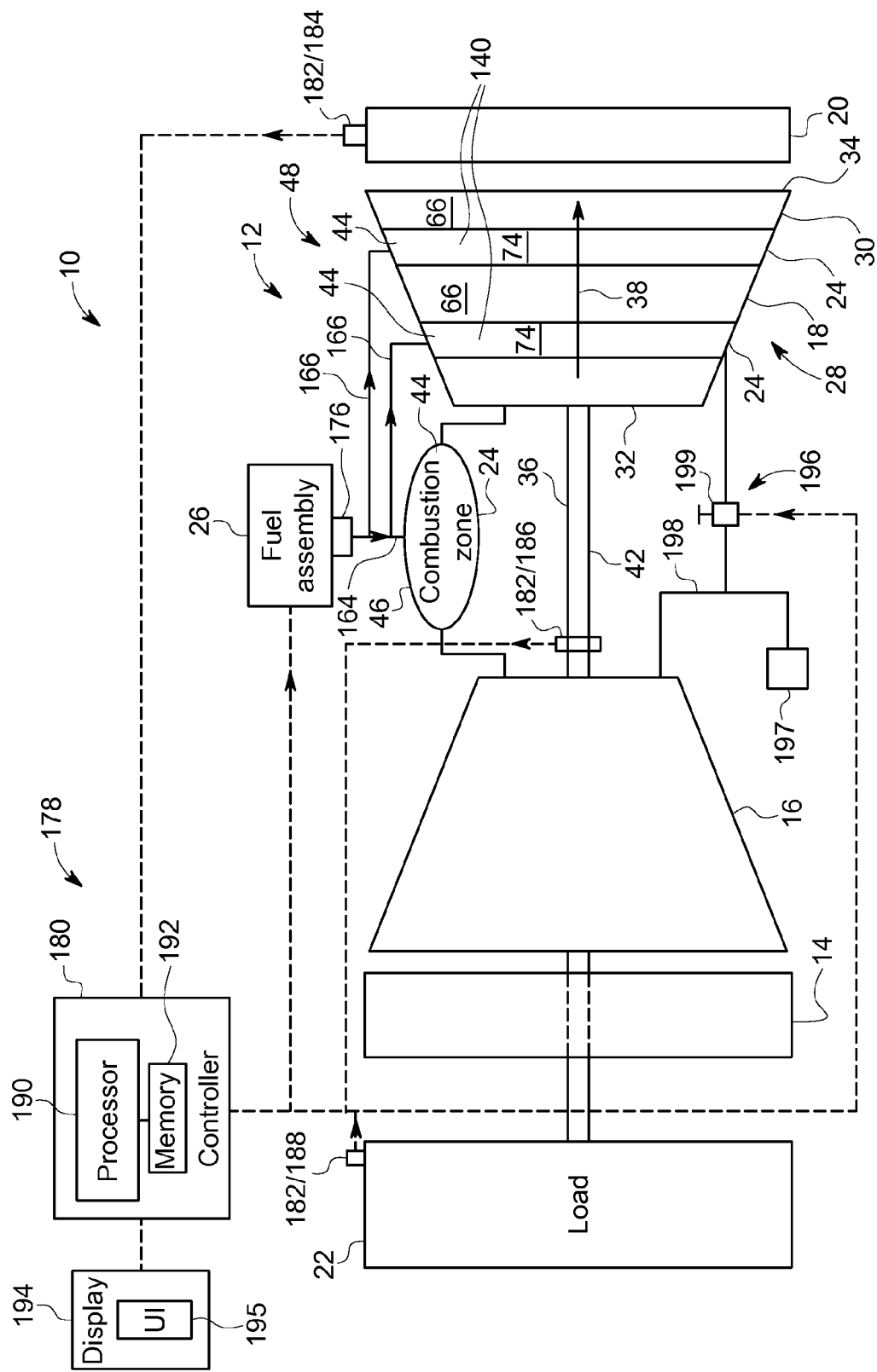
FIG. 1 is a schematic view of an exemplary turbine engine.
Figure 2:
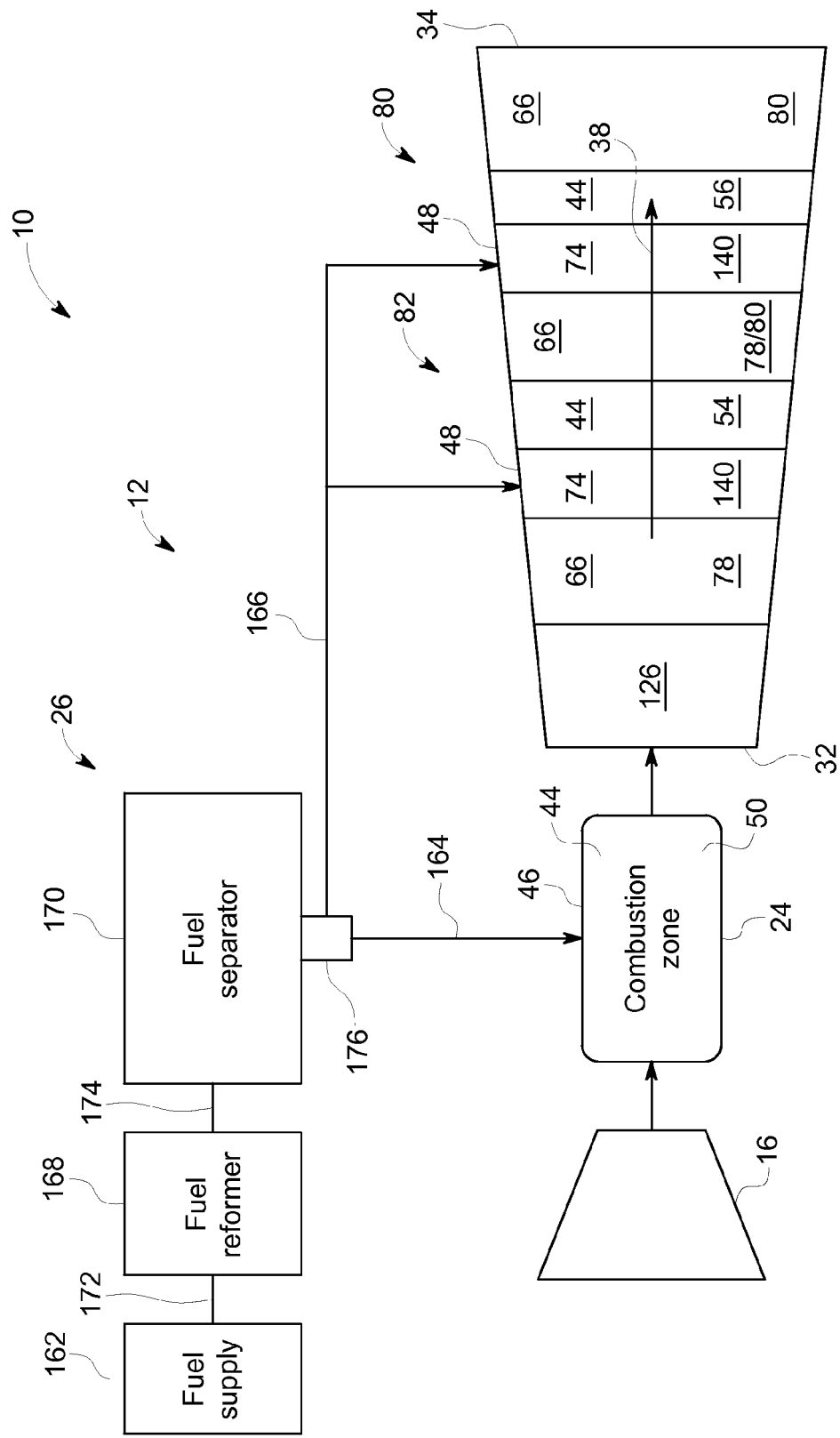
FIG. 2 is a schematic view of an exemplary combustor system that may be used with the turbine engine shown in FIG. 1.
Figure 3:
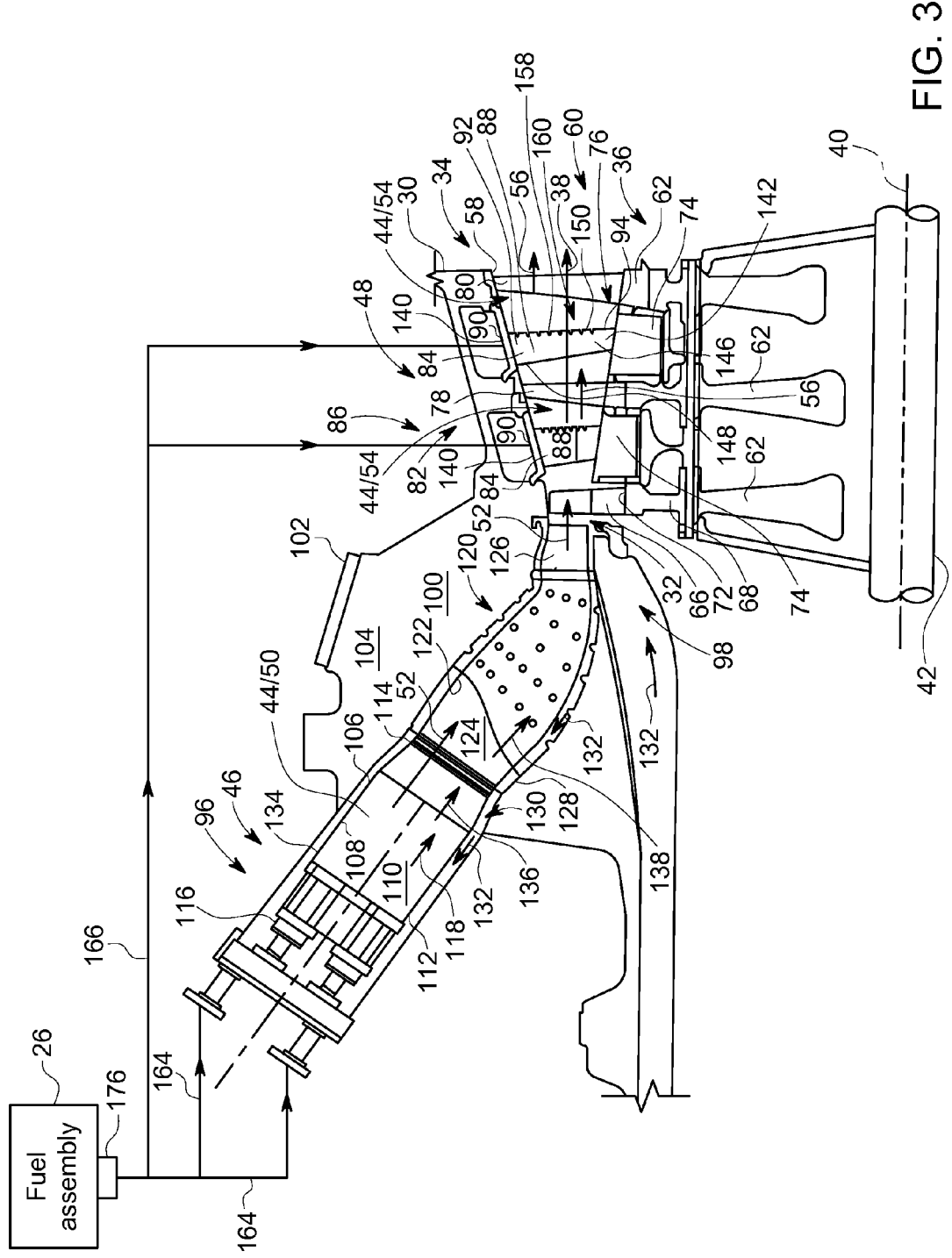
FIG. 3 is a partial sectional view of a portion of the combustor system shown in FIG. 2.

FIG. 1 is a schematic view of an exemplary turbine engine 10. FIG. 2 is a schematic view of an exemplary combustor system 12. FIG. 3 is a partial sectional view of a portion of combustor system 12. In the exemplary embodiment, turbine engine 10 includes an intake section 14, a compressor section 16 coupled downstream from intake section 14, combustor system 12 coupled downstream from compressor section 16, a turbine section 18 coupled downstream from compressor section 16, and an exhaust section 20. Turbine section 18 is rotatably coupled to compressor section 16 and to a load 22 such as, but not limited to, an electrical generator and a mechanical drive application. Intake section 14 channels air towards compressor section 16. Compressor section 16 compresses the inlet air to a higher pressure and temperature and discharges the compressed air to combustor system 12 and to turbine section 18. Combustor system 12 is coupled to compressor section 16 to receive at least a portion of compressed air from compressor section 16. In the exemplary embodiment, combustor system 12 includes a plurality of combustor assemblies 24 for channeling combustion gases through turbine section 18. Combustor system 12 also includes a fuel assembly 26 that is coupled to each combustor assembly 24 to channel fuel to each combustor assembly 24 wherein it is mixed with the compressed air and ignited to generate combustion gases that flow to turbine section 18. Combustion gases are generated and channeled to turbine section 18 wherein gas stream thermal energy is converted to mechanical rotational energy to enable turbine section 18 to drive compressor section 16 and/or load 22. Turbine section 18 channels exhaust gases to exhaust section 20 to discharge the exhaust gases to ambient atmosphere.

In the exemplary embodiment, turbine section 18 includes a turbine assembly 28 that includes a casing 30 that extends between a fluid inlet 32 and a fluid outlet 34, and a rotor assembly 36 that is positioned within casing 30. Rotor assembly 36 is oriented with respect to casing 30 such that a combustion gas path 38 is defined between rotor assembly 36 and casing 30 and extends between fluid inlet 32 and fluid outlet 34. Rotor assembly 36 extends along a centerline axis 40 and is coupled to compressor section 16 via a rotor shaft 42. In the exemplary embodiment, combustor system 12 is coupled to turbine section 18 such that a plurality of combustion zones 44 are defined with respect to turbine assembly 28. Each combustor assembly 24 generates combustion gases within each combustion zone 44, and channels the generated combustion gases through combustion gas path 38.

In the exemplary embodiment, combustor system 12 includes a first combustor assembly 46 and a second combustor assembly 48 that is oriented downstream from first combustor assembly 46. First combustor assembly 46 is coupled to turbine assembly 28 such that a first combustion zone 50 is oriented upstream of turbine assembly fluid inlet 32. First combustor assembly 46 generates a first flow of combustion gas, represented by arrow 52 within first combustion zone 50 and channels first flow of combustion gas 52 towards turbine fluid inlet 32. Second combustor assembly 48 is coupled to turbine assembly 28 such that a second combustion zone 54 is oriented between fluid inlet 32 and fluid outlet 34. Second combustor assembly 48 generates a second flow of combustion gas, represented by arrow 56, within second combustion zone 54, and channels second flow of combustion gas 56 downstream towards fluid outlet 34 along combustion gas path 38.

In the exemplary embodiment, turbine casing 30 includes an inner surface 58 that defines a cavity 60 that extends between fluid inlet 32 and fluid outlet 34. Rotor assembly 36 includes a plurality of turbine bucket assemblies 62 that are coupled to rotor shaft 42, and extend between fluid inlet 32 and fluid outlet 34. Each turbine bucket assembly 62 includes a plurality of turbine buckets 66 that extend radially outwardly from a rotor disk 68. Each rotor disk 68 is coupled to rotor shaft 42 and rotates about centerline axis 40. In the exemplary embodiment, each turbine bucket 66 is coupled to an outer surface 72 of rotor disk 68 and is spaced circumferentially about rotor disk 68 such that combustion gas path 38 is defined between turbine casing 30 and each rotor disk 68. Each turbine bucket 66 extends at least partially through a portion of combustion gas path 38.

A plurality of stator vane assemblies 74 are coupled to casing inner surface 58 and extend radially inwardly towards rotor assembly 36. Adjacent stator vane assemblies 74 are axially-spaced along rotor axis 40 such that a gap 76 is defined between each stator vane assembly 74. In the exemplary embodiment, each turbine bucket assembly 62 is positioned between adjacent vanes assemblies 74 to define combustion gas path 38. In addition, each stator vane assembly 74 is oriented to adjust a direction of flow of combustion gases to channel combustion gases downstream towards an adjacent turbine bucket assembly 62. Moreover, each stator vane assembly 74 is positioned between a first turbine bucket assembly, i.e. an upstream turbine bucket assembly 78, and a second turbine bucket assembly, i.e. a downstream turbine bucket assembly 80. In the exemplary embodiment, each stator vane assembly 74 is oriented between adjacent turbine bucket assemblies 62 to define a plurality of stages 82 that are oriented along rotor axis 40 and along combustion gas path 38. Each stage 82 includes a stator vane assembly 74 and a turbine bucket assembly 62 that is oriented downstream of the stator vane assembly 74 along rotor axis 40.

In the exemplary embodiment, each stator vane assembly 74 includes a plurality of stator vanes 84 that are coupled to casing 30 and extend radially inwardly from casing inner surface 58 towards rotor assembly 36 such that a row 86 of stator vanes 84 is between adjacent turbine bucket assemblies 62. Each stator vane 84 includes an airfoil 88 that extends outwardly from a support member 90. Support member 90 is coupled to turbine casing 30 such that airfoil 88 extends radially inwardly from casing inner surface 58 towards rotor assembly 36. Airfoil 88 extends between a root end 92 and a tip end 94. Root end 92 is coupled to support member 90. Tip end 94 extends outwardly from root end 92 towards rotor assembly 36, and is oriented adjacent rotor disk 68.

In the exemplary embodiment, first combustor assembly 46 includes a plurality of combustors 96 that are coupled to turbine assembly fluid inlet 32. First combustor assembly 46 is coupled in flow communication with turbine assembly 28 and with compressor section 16. Moreover, in the exemplary embodiment, first combustor assembly 46 includes a diffuser 98 that is coupled in flow communication with a discharge plenum 100 that enables air to be channeled downstream from compressor section 16 towards first combustor assembly 46.

In the exemplary embodiment, each combustor 96 includes a combustor casing 102 that defines a chamber 104 therein, and a combustor liner 106 that is positioned within chamber 104. Combustor liner 106 includes a substantially cylindrically-shaped inner surface 108 that defines an annular combustion chamber 110 that extends between an aft portion 112 and a forward portion 114. A plurality of fuel nozzles 116 are coupled to combustion liner aft portion 112 for channeling fuel into combustion chamber 110 to facilitate generating combustion gases within combustion chamber 110. Combustion chamber 110 defines a gas flow path 118 that extends from fuel nozzles 116 towards turbine fluid inlet 32. A transition piece 120 is coupled to combustor liner forward portion 114 and to a turbine fluid inlet 32 for channeling combustion gases from combustor liner 106 towards turbine assembly 28. Transition piece 120 includes an inner surface 122 that defines a guide cavity 124 that channels combustion gases from combustion chamber 110 downstream to fluid inlet 32. In the exemplary embodiment, turbine assembly 28 includes a stationary turbine nozzle 126 that is coupled to fluid inlet 32 for channeling combustion gases from guide cavity 124 towards turbine bucket assemblies 62 along combustion gas path 38.

A flowsleeve 128 is coupled to combustor liner 106 and is spaced radially outwardly from combustor liner 106 such that an annular passage 130 is defined between combustor liner 106 and flowsleeve 128. Annular passage 130 is sized and shaped to channel compressed air 132 from plenum 100 along an outer surface 134 of combustor liner 106, and discharge the compressed air 132 towards fuel nozzles 116. Air 132 is then mixed with fuel discharged from fuel nozzles 116 and ignited within combustion chamber 110 to form a combustion gas stream 136. Combustion gases 138 are channeled from combustion chamber 110 through transition piece guide cavity 124 towards turbine nozzle 126.

In the exemplary embodiment, second combustor assembly 48 includes a plurality of combustor stator assemblies 140 that are oriented downstream of turbine nozzle 126. Each combustor stator assembly 140 is oriented between adjacent turbine bucket assemblies 62 to at least partially define combustion gas path 38. Each combustor stator assembly 140 is also oriented with respect to a downstream turbine bucket assembly 80 such that a combustion chamber 110 is defined between combustor stator assembly 140 and downstream turbine bucket assembly 80. Combustor stator assembly 140 is coupled to fuel assembly 26 to receive fuel from fuel assembly 26, and channel fuel into combustion chamber 110 along combustion gas path 38.

In the exemplary embodiment, each combustor stator assembly 140 includes a plurality of circumferentially-spaced stator vanes 84 that extend radially inwardly from turbine casing 30 towards rotor shaft 42. At least one stator vane 84 includes at least one sidewall 142 that includes an inner surface (not shown) and an outer surface 146. Outer surface 146 extends generally axially between a leading edge 148 and a trailing edge 150 that is oriented downstream of leading edge 148. The inner surface extends between leading edge 148 and trailing edge 150 such that a cavity (not shown) is defined between leading edge 148 and trailing edge 150. A plurality of fuel apertures 158 extend through sidewall 142 to couple the cavity in flow communication with combustion gas path 38. Fuel assembly 26 channels a flow of fuel to stator vane 84 and into the stator vane cavity. Each fuel aperture 158 is sized and shaped to discharge fuel from fuel assembly 26 into combustion gas path 38. In one embodiment, fuel apertures 158 are defined adjacent trailing edge 150, and are oriented in a row 160 that extends between tip end 94 and root end 92. Alternatively, fuel apertures 158 may be defined adjacent leading edge 148, and/or may be defined at any location between trailing edge 150 and leading edge 148. In addition, in one embodiment, at least one fuel aperture is defined through leading edge 148 and is configured to discharge fuel in an upstream direction that is opposite a flow of combustion gases to facilitate mixing of the fuel within combustion gas path 38. In the exemplary embodiment, second combustor assembly 48 does not include fuel igniters. More specifically, combustion gases channeled through turbine assembly 28 include a temperature and a pressure that enable fuel channeled through second combustor assembly 48 to be ignited within second combustion zone 54 without fuel igniters.

Fuel assembly 26 is coupled to each combustor assembly 24 to selectively channel fuel from a fuel supply 162 to each combustor assembly 24. In the exemplary embodiment, fuel assembly 26 channels a first fuel flow 164 to first combustor assembly 46, and channels a second fuel flow 166 to second combustor assembly 48. In the exemplary embodiment, first fuel flow 164 is substantially similar to second fuel flow 166. In another embodiment, first fuel flow 164 may be different than second fuel flow 166. In addition, fuel assembly 26 may channel a plurality of different fuel flows to each combustor stator assembly 140.

In the exemplary embodiment, fuel assembly 26 includes a fuel reformer 168 and a fuel separator 170. Fuel reformer 168 is configured to receive a flow of fuel 172 from fuel supply 162, and channels a fuel mixture 174 including first fuel flow 164 and second fuel flow 166 to fuel separator 170. Fuel separator 170 receives fuel mixture 174 and separates fuel mixture 174 into first fuel flow 164 and second fuel flow 166. Fuel assembly 26 also includes a flow control assembly 176 that is coupled to fuel separator 170 for selectively channeling first fuel flow 164 to first combustor assembly 46, and selectively channeling second fuel flow 166 to second combustor assembly 48.

In the exemplary embodiment, during operation, fuel assembly 26 receives a flow of natural gas from fuel supply 162. In one embodiment, fuel assembly 26 receives a flow of synthetic gas ("syngas"), syngas with pre-combustion carbon-capture (which results in a high-hydrogen fuel), and/or natural gas with elevated percentages of higher-hydrocarbons, and/or any suitable fuel that enables combustor system 12 to function as described herein. In the exemplary embodiment, fuel reformer 168 treats the flow of natural gas to generate a fuel mixture including carbon monoxide (CO) and hydrogen ($H_2$). Fuel separator 170 receives fuel mixture 174 from fuel reformer 168 and separates fuel mixture 174 into a first fuel flow 164 including a high carbon monoxide (CO) stream, and a second fuel flow 166 including high-hydrogen ($H_2$) stream. Flow control assembly 176 selectively channels the high CO stream 164 to first combustor assembly 46 to generate first flow of combustion gas 52, and selectively channels the high $H_2$ stream 166 to second combustor assembly 48 to generate second flow of combustion gas 56.

In the exemplary embodiment, combustor system 12 includes a control system 178 that is coupled in operative communication to fuel assembly 26 to operate fuel assembly 26 to selectively generate first and second combustion gas flows 52 and 56. More specifically, control system 178 operates combustor system 12 to adjust a power output of turbine engine 10. In the exemplary embodiment, control system 178 includes a controller 180 that is coupled to one or more sensors 182. Each sensor 182 senses various parameters relative to the operation and environmental conditions of turbine engine 10. Sensors 182 may include, but are not limited to only including, temperature sensors, rotational speed sensors, fluid pressure sensors, power output sensors, and/or any other sensors that sense various parameters relative to the operation of turbine engine 10. As used herein, the term "parameters" refers to physical properties whose values can be used to define the operating conditions of turbine engine 10, such as a temperature, a rotor speed, and/or a power output at defined locations.

In the exemplary embodiment, control system 178 includes a temperature sensor 184 coupled to turbine assembly 28 for sensing a temperature of exhaust gases discharged from turbine assembly 28, and transmitting a signal indicative of the sensed discharge temperature to controller 180. In addition, control system 178 includes a speed sensor 186 coupled to rotor shaft 42 for sensing a rotational speed of rotor shaft 42, and transmitting a signal indicative of the sensed rotational speed to controller 180. Control system 178 also includes a power output sensor 188 coupled to generator 22 for sensing a power output of generator 22.

Controller 180 includes a processor 190 and a memory device 192. Processor 190 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Memory device 192 includes a computer readable medium, such as, without limitation, random access memory (RAM), flash memory, a hard disk drive, a solid state drive, a diskette, a flash drive, a compact disc, a digital video disc, and/or any suitable device that enables processor 190 to store, retrieve, and/or execute instructions and/or data.

Controller 180 also includes a display 194 and a user interface 195. Display 194 may include a vacuum fluorescent display (VFD) and/or one or more light-emitting diodes (LED). Additionally or alternatively, display 194 may include, without limitation, a liquid crystal display (LCD), a cathode ray tube (CRT), a plasma display, and/or any suitable visual output device capable of displaying graphical data and/or text to a user. In an exemplary embodiment, a temperature of turbine assembly 28, a power output of generator 22, a rotational speed of rotor shaft 42, and/or any other information may be displayed to a user on display 194. User interface 195 includes, without limitation, a keyboard, a keypad, a touch-sensitive screen, a scroll wheel, a pointing device, a barcode reader, a magnetic card reader, a radio frequency identification (RFID) card reader, an audio input device employing speech-recognition software, and/or any suitable device that enables a user to input data into controller 180 and/or to retrieve data from controller 180. In an exemplary embodiment, the user may input a predefined discharge temperature setting for turbine assembly exhaust. In addition, the user may input a predefined power output setting for turbine engine 10, and/or a predefined rotor speed for rotor assembly 36. Moreover, the user may operate user interface 195 to initiate and/or terminate an operation of combustor system 12, and/or adjust a fuel flow being channeled to each combustor assembly 24.

Various connections are available between controller 180, sensors 182, and fuel assembly 26, and between processor 190, display 194, and/or user interface 195. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside turbine engine 10) network connection, whether wired or wireless.

In the exemplary embodiment, combustor system 12 also includes a purge air system 196 (shown in FIG. 1) that is coupled to a cooling fluid source 197 and second combustor assembly 48 for selectively channeling cooling fluid from cooling fluid source 197 to second combustor assembly 48. In one embodiment, cooling fluid source 197 includes compressor section 16. Alternatively, cooling fluid source 197 may include any suitable source of pressurized purge fluid that enables combustor system 12 to function as described herein. In the exemplary embodiment, purge air system 196 includes at least one fluid supply line 198 coupled between a cooling fluid source 197 such as, for example, compressor section 16 and second combustor assembly 48, and one or more control valves 199 coupled to supply line 198 to selectively enable cooling fluid to be channeled from compressor section 16 to second combustor assembly 48. Control system 178 is coupled in operative communication to purge air system 196 to operate purge air system 196 and fuel assembly 26 in substantial synchronicity such that control valve 199 prevents cooling fluid from being channeled to second combustor assembly 48 when flow control assembly 176 channels fuel to second combustor assembly 48, and flow control assembly 176 prevents fuel from being channeled to second combustor assembly 48 when purge air system 196 channels cooling fluid to second combustor assembly 48.

In the exemplary embodiment, during operation, control system 178 operates combustor system 12 based at least in part on the sensed discharge temperature, the sensed rotational speed, and/or the sensed power output. In addition, control system 178 selectively adjusts fuel being channeled to each combustor assembly 24 to adjust a discharge exhaust temperature, a rotor speed, and/or a power output of turbine engine 10.

Figure 4:
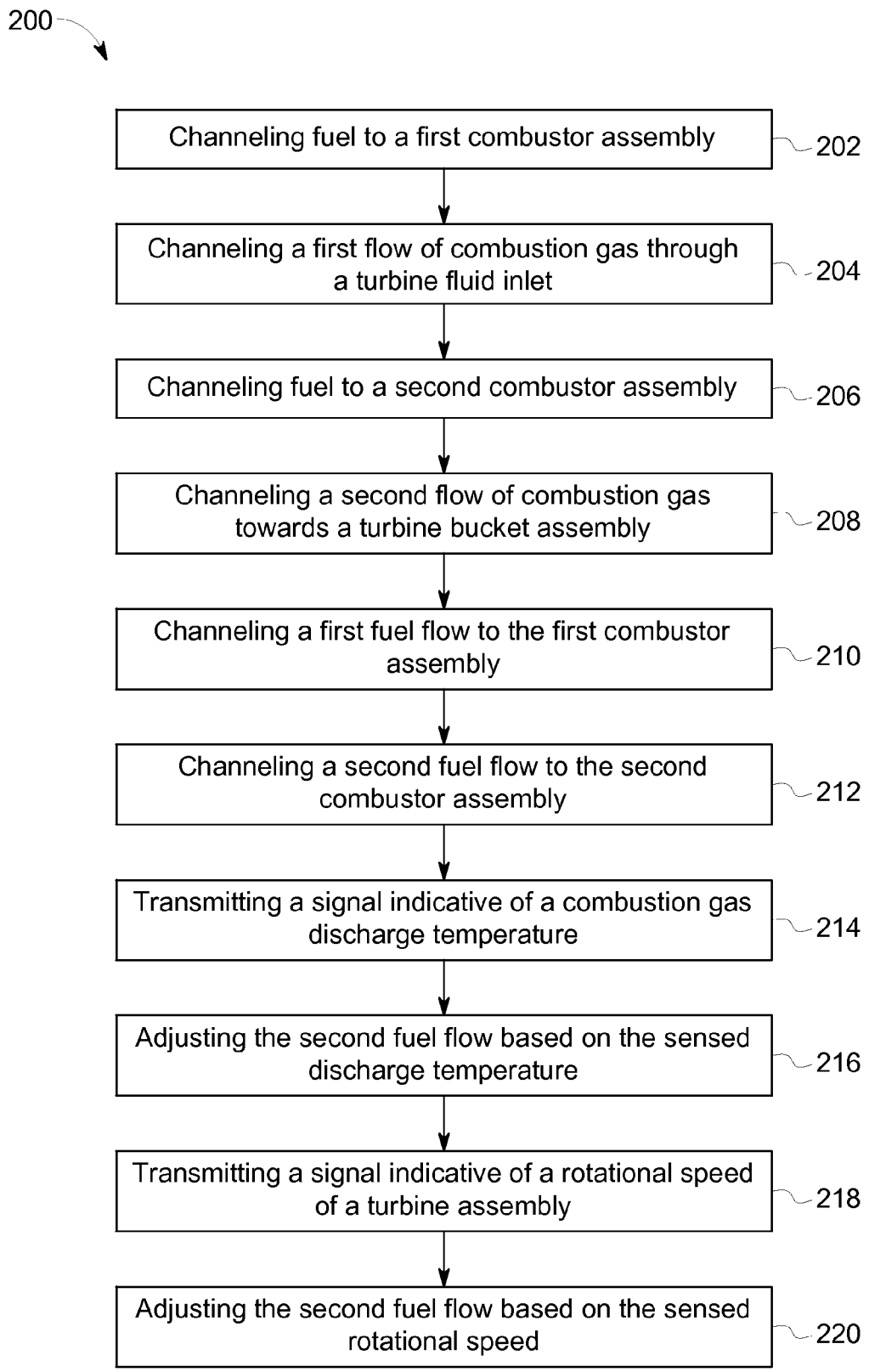
FIG. 4 is a flow chart of an exemplary method that may be used in operating the turbine engine shown in FIG. 1.

FIG. 4 is a flow chart of an exemplary method 200 that may be used in operating turbine engine 10. In the exemplary embodiment, method 200 includes channeling 202 fuel to first combustor assembly 46 for generating first flow of combustion gas 52, and channeling 204 the generated first flow of combustion gas 52 through the turbine fluid inlet 32. Method 200 also includes channeling 206 fuel to second combustor assembly 48 for generating second flow of combustion gas 56 within combustion gas path 38, and channeling 208 the generated second flow of combustion gas 56 towards a downstream turbine bucket assembly 80.

In addition, method 200 includes channeling 210 first fuel flow 164 to first combustor assembly 46, and channeling 212 second fuel flow 166 to second combustor assembly 48, wherein second fuel flow 166 is different than first fuel flow 164. Moreover, method 200 includes transmitting 214, from sensor 182 to controller 180, a first monitoring signal indicative of a combustion gas discharge temperature, and adjusting 216 the second fuel flow 166 channeled to second combustor assembly 48 based at least in part on the sensed combustion gas discharge temperature. Method 200 also includes transmitting 218 a monitoring signal indicative of a rotational speed of turbine assembly 28, and adjusting 220 the second fuel flow 166 channeled to second combustor assembly 48 based at least in part on the sensed turbine rotational speed.

The above-described combustor system overcomes at least some disadvantages of known turbine engines by providing a combustor system that channels a first flow of combustion gases through a turbine inlet towards a combustion gas path, and channels a second flow of combustion gases between the inlet and a turbine outlet along the combustion gas path. More specifically, the combustor system includes a first combustion assembly that is oriented with respect to the turbine inlet, and a second combustion assembly that is oriented between adjacent turbine bucket assemblies along the combustion gas path. By providing a second combustor assembly that generates a second combustion gas flow within the combustion gas path, the operating efficiency of the turbine is increased over known turbine engines. Moreover, the secondary flow losses that are generated within the combustion gas path are reduced, thus reducing the losses in gas energy and increasing the useful life of the turbine engine.

Exemplary embodiments of a combustor system for use in turbine engines and methods of operating a turbine engine are described above in detail. The methods and apparatus are not limited to the specific embodiments described herein, but rather, components of systems and/or steps of the method may be utilized independently and separately from other components and/or steps described herein. For example, the methods and apparatus may also be used in combination with other combustion systems and methods, and are not limited to practice with only the turbine engine as described herein. Rather, the exemplary embodiment can be implemented and utilized in connection with many other combustion system applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A combustor system for use in a turbine engine including a turbine assembly that includes a fluid inlet, a fluid outlet, and a combustion gas path defined therebetween, said combustor system comprising:
a first combustor assembly coupled to the turbine assembly for channeling a first flow of combustion gases through the turbine assembly, said first combustor assembly oriented adjacent to the turbine assembly inlet to channel the first flow of combustion gases to the turbine assembly through the turbine inlet;
a second combustor assembly coupled to the turbine assembly along the combustion gas path for channeling a second flow of combustion gases through the turbine assembly; and
a fuel assembly comprising a fuel reformer that treats a fuel from a fuel supply to generate a fuel mixture, a fuel separator that separates the fuel mixture into a first fuel flow and second fuel flow, wherein the first fuel flow is different than the second fuel flow, and a flow control assembly that channels the first fuel flow to the first combustor assembly and channels the second fuel flow to said second combustor assembly.

2. The combustor system in accordance with claim 1, wherein the turbine assembly includes a plurality of turbine bucket assemblies axially-spaced along the combustion gas path, each turbine bucket assembly includes a plurality of circumferentially-spaced turbine buckets coupled to a rotor shaft, said second combustion assembly comprising a plurality of circumferentially-spaced stator vanes extending radially inwardly from a turbine casing towards the rotor shaft, said plurality of stator vanes oriented between adjacent turbine bucket assemblies to at least partially define the combustion gas path.

3. The combustor system in accordance with claim 2, wherein at least one stator vane of the plurality of stator vanes includes a leading edge, a trailing edge, a sidewall extending between the leading edge and the trialing edge, and a plurality of fuel apertures extending through the sidewall for channeling fuel into the combustion gas path and towards a turbine bucket assembly oriented downstream of said second combustor assembly.

4. The combustor system in accordance with claim 1, wherein the fuel reformer treats the fuel to form the fuel mixture including carbon monoxide and hydrogen.

5. The combustor system in accordance with claim 4, wherein the fuel separator separates the fuel mixture into the first fuel flow including a high carbon monoxide stream and the second fuel flow including a high hydrogen stream.

6. The combustor system in accordance with claim 5, wherein the fuel is synthetic gas, synthetic gas with pre-combustion carbon-capture, or natural gas.

7. A turbine engine comprising:
a compressor section;
a turbine assembly coupled to said compressor section, said turbine assembly including a casing defining a cavity extending between a fluid inlet and a fluid outlet, and a plurality of turbine bucket assemblies extending between the fluid inlet and the fluid outlet such that a combustion gas path is defined between the fluid inlet and the fluid outlet;
a first combustor assembly coupled to said compressor section to receive at least some of the air discharged by said compressor section, said first combustor assembly oriented adjacent said turbine assembly inlet to channel a first flow of combustion gases to said turbine assembly through said turbine inlet;
a second combustor assembly coupled to said turbine assembly for channeling a second flow of combustion gases through said turbine assembly, said second combustor assembly coupled between adjacent turbine bucket assemblies; and
a fuel assembly comprising a fuel reformer that treats a fuel supply to generate a fuel mixture, a fuel separator that separates the fuel mixture into a first fuel, flow and second fuel flow wherein the first fuel flow is different than the second fuel, flow and a flow control assembly that channels the first fuel flow to the first combustor assembly and channels the second fuel flow to said second combustor assembly.

8. The turbine engine in accordance with claim 7, wherein adjacent turbine bucket assemblies are axially-spaced along, a centerline axis, each turbine bucket assembly of said plurality of turbine bucket assemblies includes a plurality of circumferentially-spaced turbine buckets coupled to a rotor shaft, said second combustion assembly comprising a plurality of circumferentially-spaced stator vanes extending radially inwardly from said turbine casing towards said rotor shaft, said plurality of stator vanes oriented between said adjacent turbine bucket assemblies to at least partially define the combustion gas path.

9. The turbine engine in accordance with claim 8, wherein at least one stator vane of said plurality of stator vanes includes a leading edge, a trailing edge, a sidewall extending between the leading edge and the trialing edge, and a plurality of fuel apertures extending through said sidewall for channeling fuel into the combustion gas path and towards a turbine bucket assembly oriented downstream of said second combustor assembly.

10. The turbine engine in accordance with claim 7, wherein the fuel reformer treats the fuel to form the fuel mixture including carbon monoxide and hydrogen.

11. The turbine engine in accordance with claim 10, wherein the fuel separator separates the fuel mixture into the first fuel flow including a high carbon monoxide stream and the second fuel flow including a high hydrogen stream.

12. The turbine engine in accordance with claim 11, wherein the fuel is synthetic gas, synthetic gas with pre-combustion carbon-capture, or natural gas.

13. A method of operating a turbine engine comprising:
treating a flow of fuel to generate a fuel mixture including carbon monoxide and hydrogen;
separating the fuel mixture into a first fuel flow including a high carbon monoxide stream and a second fuel flow including a high hydrogen stream;
channeling the first fuel flow to a first combustor assembly for generating a first, flow of combustion gas, the first combustor assembly coupled to a turbine assembly including an inlet, an outlet, and a plurality of turbine bucket assemblies that define a combustion gas path between the inlet and the outlet;
channeling the generated first flow of combustion gas through the turbine assembly inlet and towards each turbine bucket assembly of the plurality of turbine bucket assemblies along the combustion gas path;
channeling the second fuel flow to a second combustor assembly for generating a second flow of combustion gas within the combustion gas path, the second combustor assembly is oriented between a pair of turbine bucket assemblies to at least partially define the combustion gas path; and
channeling the generated second flow of combustion gas towards a downstream turbine bucket assembly of the pair of turbine bucket assemblies along the combustion gas path.

14. The method in accordance with claim 13, further comprising:
adjusting the second fuel flow being channeled to the second combustion assembly based at least in part on a combustion gas discharge temperature.

15. The method in accordance with claim 13, further comprising:
adjusting the second fuel flow based at least in part on a turbine rotational speed.

16. The method in accordance with claim 13, further comprising:
adjusting the second fuel flow based at least in part on a combustion gas discharge temperature, a turbine rotational speed, a power output of the turbine engine, or any combination thereof.

17. The method in accordance with claim 13, further comprising:
adjusting at least one of the first fuel flow or the second fuel flow to adjust at least one of a combustion gas discharge temperature, a turbine rotational speed, or a power output of the turbine engine.

18. The method in accordance with claim 13, wherein the fuel is synthetic gas.

19. The method in accordance with claim 13, wherein the fuel is synthetic gas with pre-combustion carbon-capture.

20. The method in accordance with claim 13, wherein the fuel is natural gas.

* * * * *